(12) United States Patent
Gaboury et al.

(10) Patent No.: US 10,536,576 B1
(45) Date of Patent: Jan. 14, 2020

(54) LOAD COIL MEASUREMENT IN A NETWORK USING A PSEUDORANDOM BINARY SEQUENCE (PRBS) BASED TECHNIQUE

(71) Applicant: VIAVI SOLUTIONS INC., San Jose, CA (US)

(72) Inventors: Gerald Gaboury, Germantown, MD (US); John Handwork, Germantown, MD (US)

(73) Assignee: VIAVI SOLUTIONS INC., San Jose, CA (US)

( * ) Notice: Subject to any disclaimer, the term of this patent is extended or adjusted under 35 U.S.C. 154(b) by 0 days.

(21) Appl. No.: 16/028,153

(22) Filed: Jul. 5, 2018

(51) Int. Cl.
  H04M 3/30 (2006.01)
  H04L 12/26 (2006.01)
  H04L 5/00 (2006.01)
  H04B 3/46 (2015.01)

(52) U.S. Cl.
  CPC ............ H04M 3/305 (2013.01); H04B 3/46 (2013.01); H04L 5/0053 (2013.01); H04L 43/50 (2013.01)

(58) Field of Classification Search
  CPC ...... H04M 3/306; H04M 3/30; H04M 3/2209; H03F 3/1935; H03F 3/1936; H03G 3/3036; H04B 3/46; G01R 23/16; H04L 9/14; H04L 9/3271; H04W 12/04; C07F 9/5728; C07F 6/6541; C07F 9/655345
  USPC .......... 379/1.01, 1.03, 1.04, 9, 10.01, 10.03, 379/15.01, 15.03, 22.02, 23, 24, 27.01, 379/29.01, 30, 31, 21
  See application file for complete search history.

(56) References Cited

U.S. PATENT DOCUMENTS

| 4,067,060 | A  | * | 1/1978  | Poussart  | G01R 23/16 324/76.21 |
|-----------|----|---|---------|-----------|----------------------|
| 5,404,388 | A  | * | 4/1995  | Eu        | G01R 19/25 379/24    |
| 6,687,336 | B1 | * | 2/2004  | Holeys    | H04B 3/46 379/1.04   |
| 6,867,600 | B1 | * | 3/2005  | Iskanius  | G01R 31/11 324/534   |
| 7,302,046 | B2 | * | 11/2007 | Kramer    | H04M 3/30 379/1.04   |
| 8,917,818 | B2 | * | 12/2014 | Rozendaal | H04M 3/306 379/1.01  |
| 2002/0067802 | A1 | * | 6/2002 | Smith  | H04B 3/46 379/1.04   |

(Continued)

*Primary Examiner* — Binh Kien Tieu
(74) *Attorney, Agent, or Firm* — Mannava & Kang, P.C.

(57) ABSTRACT

A test device for measuring load coils in a network using a pseudorandom binary sequence (PRBS) based technique is disclosed. The test device may comprise a transmitter to transmit a plurality of test signals at a test point in a network. The test device may comprise a receiver to receive a plurality of response signals at the test point. The test device may also comprise a processor to analyze the plurality of response signals and perform at least one load coil measurement. The processor may achieve this by applying a transformation calculation to generate a plurality of terms of the transformation calculation simultaneously, converting the plurality of terms of the transformation calculation into a plurality of impedances, converting the plurality of impedances into polynomials using a conversion technique, analyzing the polynomials for poles and zeros, and estimating at least one load coil measurement based on the poles and zeros of the polynomials.

18 Claims, 4 Drawing Sheets

(56) References Cited

U.S. PATENT DOCUMENTS

| | | | |
|---|---|---|---|
| 2004/0267678 A1* | 12/2004 | Gao | H04M 3/306 706/2 |
| 2006/0115056 A1* | 6/2006 | Kramer | H04M 3/30 379/22.02 |
| 2008/0006694 A1* | 1/2008 | Hoffer | G01S 7/412 235/435 |
| 2012/0089371 A1* | 4/2012 | Yamaguchi | G01R 13/0272 702/189 |
| 2014/0198902 A1* | 7/2014 | Rozendaal | H04M 3/306 379/24 |
| 2015/0253388 A1* | 9/2015 | Masuda | G01R 31/3163 324/96 |

\* cited by examiner

LOAD COIL MEASUREMENT IN A NETWORK USING A PSEUDORANDOM BINARY SEQUENCE (PRBS) BASED TECHNIQUE

TECHNICAL FIELD

This patent application relates generally to telecommunications networks, and more specifically, to systems and methods for measuring load coils in a network using a pseudorandom binary sequence (PRBS) based technique.

BACKGROUND

Digital subscriber line (DSL) technology allows digital data to be transmitted over telephone lines. DSL service can be delivered simultaneously with wired telephone service on the same telephone line (e.g., over standard copper pair facilities) since DSL typically uses higher frequency bands for data transmission. Although it is becoming increasingly popular to transmit data using high-bandwidth fiber-optic cable, installation of these fiber-optic cables is extremely cumbersome and expensive. Because DSL service may be employed over existing copper-based cables, DSL is still widely used and advancements in DSL technologies continue to persist. However, testing copper-based cables remains a challenge.

Technicians are not typically trained or able to identify and repair copper-related impairments on their own, and often rely on a copper expert. As a result, the process to identify and repair copper-related impairments is often drawn-out and inefficient. Load coils, for example, may act as low pass filters and must be removed for DSL to work properly. An inexperienced or untrained technician will rely on a copper expert to locate load coils and find a fix. This may extend repair times and increase usage of resources. Furthermore, conventional techniques for load coil measurements are cumbersome and inefficient.

As a result, a technique for measuring load coils in a more reliable and efficient way may be helpful to increase network testing efficiencies and overcome shortcomings of conventional technologies.

BRIEF DESCRIPTION OF DRAWINGS

Features of the present disclosure are illustrated by way of example and not limited in the following Figure(s), in which like numerals indicate like elements, in which.

DETAILED DESCRIPTION

Figure 1:
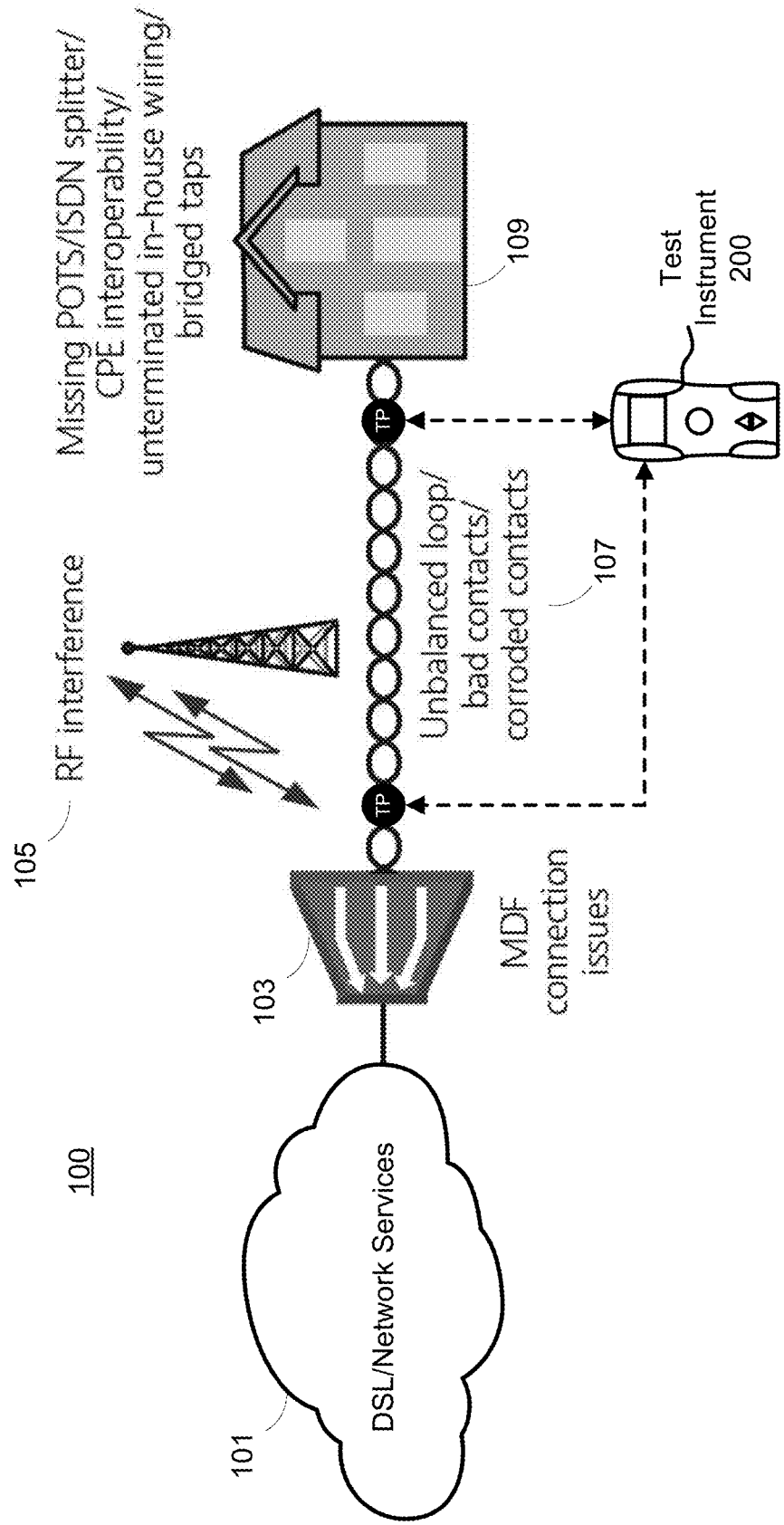
FIG. 1 illustrates a system diagram for DSL-related problems in a network, according to an example.

For simplicity and illustrative purposes, the present disclosure is described by referring mainly to examples and embodiments thereof. In the following description, numerous specific details are set forth in order to provide a thorough understanding of the present disclosure. It will be readily apparent, however, that the present disclosure may be practiced without limitation to these specific details. In other instances, some methods and structures readily understood by one of ordinary skill in the art have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Although it is becoming increasingly popular to transmit data using high-bandwidth fiber-optic cable, DSL is still widely used for transmission of data because DSL services may be employed over existing copper-based cables. Most homes and businesses that use DSL service may be connected to an asymmetric DSL (ADSL) line. ADSL divides up available frequencies in a line on the assumption that most users look at (or download) much more data than they send (or upload). ADSL service may then be primed to provide more download capability based on this assumption.

Precisely how much benefit a user gets from using ADSL may depend on how far the user (or users equipment) is from the central office of the company providing the ADSL service (or service provider), After all, ADSL is a distance-sensitive technology. In other words, as the connection length increases, signal quality decreases and connection speed goes down. A typical limit for ADSL service may be 18,000 feet (5,460 meters).

Advancements and variations in DSL technologies have sought to address some of these distance or quality-related problems. For example, very high bit-rate DSL (VDSL) may provide a very fast connection, may be capable of handling Internet access, high-definition television (HDTV), and on-demand services at rates of 52 Mbps downstream and 12 Mbps upstream. However. VDSL typically works best over shorter distances. Symmetric DSL (SDSL) may be another option used by small businesses. Although SDSL may not allow simultaneous phone usage, there may be more available frequency (and therefore speed) for receiving and sending data. Rate-adaptive DSL (RADSL) may be considered a variation of ADSL, in which a modem may adjust a speed of the connection depending on length and quality of the line. Integrated Services Digital Network (ISDN) DSL (IDSL) may be used as well. IDSL may be combination of the ISDN and DSL technology. IDSL may be faster than ISDN connections but slower than DSL. However, IDSL service may travel a longer distance, e.g., 5 to 6 miles, so it may be a better option for customers who are unable to get DSL in their area. Universal DLS (Uni-DSL) may offer backwards compatibility with existing versions of DSL. Uni-DSL may provide somewhat of a middle ground between ASDL and VDSL. For example, at longer distances, it may reach the speeds of ASDL, but it may provide greater speeds than VDSL at shorter distances. In some locations, Uni-DSL may provide four times the amount of speed as VDSL.

Because of existing infrastructure and cost, DSL and all its related technologies remains a popular low-cost option for data services. An important part of DSL services may include properly testing and maintaining copper. What may have worked for plain old telephone service (POTS) or lower-speed DSL may no longer work for VDSL, for degrading plants, or other new DSL technologies. As shown in Table 1 below, several copper-related tests may be shown, including what each test does and its importance to DSL.

TABLE 1

TYPES OF COPPER TESTS

| Copper Tests | What It Tests | Why It Is Needed |
|---|---|---|
| Voltage | Foreign voltages | Safety and identifies cross-battery impairments |
| Resistance | Insulation between tip-A and ring-B and between tip-A, ring-B, and ground-E | Leakage resistance affects DSL sync and performance |
| Opens (capacitance) | Loop length and capacitive balance | Cabin damage, one side open, loop length must be acceptable for DSL |
| Balance | Longitudinal balance, resistive balance, capacitive balance | Robustness against noise, otherwise reduced BPT |
| Load coil | Presence of load coils | Load coils act as low-pass filters and must be removed for DSL to work properly |
| Ground check | Ground connection check for balance | Poor or lack of ground leads to incorrect results, hides possible impairments |

Testing copper-based cables may be an important part of DSL provisioning and servicing. However, adequate testing and repeatability still remain challenging. Furthermore, as described above, technicians may not typically be able to identify and repair copper-related impairments on their own, and may often rely on a copper expert. For example, an inexperienced technician may call a copper expert as soon as he or she encounters a potential copper-related problem he or she is unable to find a fix. Reaching out to a copper expert may be done even without being sure the copper is faulty, extending repair times and overloading usage of resources. In addition, current methods do not look at a cable pair under test to determine what the overall condition of the pair is nor do they provide recommendations on all the steps to remedy the problem.

Detecting the presence of load coils may be an important part of ensuring proper network functionality, as shown in Table 1. This is because low coils may act as low pass filters, and if they are not removed, a DSL network may not function properly to provide adequate network services to customers. Since conventional load coil detection techniques may require significant calculation time, the load coil measurement technique using PRBS, as described herein, may provide load coil detection in a more expedient and reliable way.

FIG. 1 illustrates a system diagram 100 for DSL-related problems in a network, according to an example. In FIG. 1, DSL/network service 101 may be provided to a customer premise 109, but such service may be limited by variety of factors. For example, there may be MDF connection issues 103. There may also be RF interference 105 from external sources. Most notably, there may be problems in or at the copper cables themselves 107. For example, these may include unbalanced loops, bad or corroded contacts, foreign voltage, opens shorts, and load coils, all of which may impact DSL services and overall DSL performance at the customer premise 109. A test instrument 200 may be used to perform various tests at one or more test points (TP) in the network.

Load coil measurement, as described herein, may help identify presence of load coils, pinpoint their locations, and remove them to ensure network quality and performance. More than just a series of tests, copper impairment testing and remediation, as described herein, may also provide a more comprehensive and robust approach to testing and remediation of copper-based services.

Figure 2:
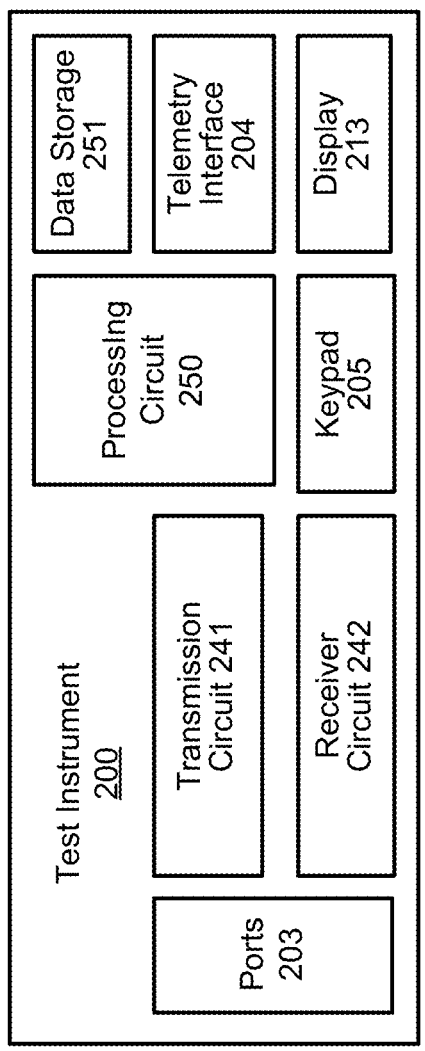
FIG. 2 illustrates a test instrument for measuring load coils in a network using a PRBS-based technique, according to an example.

FIG. 2 illustrates a test instrument 200 for measuring load coils in a network using pseudorandom binary sequence (PRBS), according to an example. The test instrument 200 for measuring load coils may include a variety of components. The test instrument 200 may be connected to a network (e.g., a DSL network or service) at any desired test point (TP) to measure signals transmitted in the network. The test instrument 200 may include one or more ports 203 to connect to the test point. In an example, the ports 203 may include coaxial RF cable connectors, as well as other non-cable ports, for example, to connect to a computer or to an external display, such as, but not exclusively, one or more USB ports, telephone, and the like.

The test instrument 200 may include a telemetry interface 204 for connecting to a telemetry channel, such as a WiFi interface, Bluetooth interface, cellular interface or another network interface. The test instrument 200 may also connect to a remote device via the telemetry interface 204.

It should be appreciated that the test instrument 200 for measuring load coils may include a user interface which may include a keypad 205 and display 213. The display may include a touch screen display. A user may interact with the test instrument 200 via the user interface to enter information, select operations, view measurements, examine signal profiles, communicate with other devices, etc.

A data storage 251 may also be found in the test instrument 200. The data storage 251 may store any information used by the test instrument 200 and may include memory or another type of known data storage device. The data storage 251 may store data, power level measurements and/or any other measurements or data used by the test instrument. The data storage 251 may include a non-transitory computer readable medium storing machine-readable instructions executable by processing circuit to perform operations of the test instrument 200.

A transmission circuit 241 may include a circuit for sending test signals into the cell site to perform various tests. The transmission circuit 241 may include encoders, modulators, and other known component for transmitting signals in the network. A receiver circuit 242 may include components for receiving signals from the network. The transmission circuit 241 and/or the receiver circuit 242 may also include other components, such as a demodulator, a decoder, an ADC, and/or other circuit components or elements.

A processing circuit 250 in the test instrument 200 may include any suitable hardware to perform the operations of the test instrument 200 described herein. The hardware of the test instrument 200, including the processing circuit 250, may include a hardware processor, microcontroller, a digital signal processor (DSP), an application specific integrated circuit (ASIC), a field programmable gate array (FPGA) or other programmable logic device, discrete gate or transistor logic, discrete hardware components, or any combination thereof designed to perform the functions and methods described herein. In an example, one or more of the functions and operations of the test instrument described herein may be performed by the processing circuit or other hardware executing machine readable instructions stored in a non-transitory computer readable medium, which may comprise RAM (random access memory), ROM (read only memory), EPROM (erasable, programmable ROM), EEPROM (electrically erasable, programmable ROM), hard drives, flash memory, or other types of storage devices, which may be volatile and/or nonvolatile. It should be appreciated that the test instrument 200 may include components other than what is shown.

The test instrument 200, among other things, may measure bit error rate (BER), service disruption time (SDT), and various stress-test device under tests (DUTs) to verify performance under severe conditions. This may increase testing efficiencies and minimize expense. Other various tests may also be performed. For instance, a pseudorandom binary sequence (PRBS) may be used for load coil measurement.

PRBS is a pseudorandom binary sequence, which may be useful in various network testing. PRBS has been used in several areas including telecommunication, encryption, etc. Load coil measurements, as described herein, may use PRBS for performing a spectral sweep measurement. It should also be appreciated that test patterns using PRBS may be standardized, such as that proposed by at least IEEE 802.3bs, and may be useful for measuring key performance parameters. In addition to the advantages described herein, some key performance parameters may include optical/analog performance parameters, receiver sensitivity and jitter, or other features. Moreover, performance analysis and troubleshooting may be greatly improved by being able to stimulate, detect, and analyze signals at the test device using PRBS.

A load coil algorithm may be comprised of two parts: (1) generation of a spectral sweep to measure the frequency response of the circuit; and (2) analysis of resultant response curve. Using PRBS in load coil measurements may facilitate calculations and ultimately reduce the time required to perform a spectral sweep.

It should be appreciated that a test measurement for detecting and measuring load coils may include a series of tones, sine waves, at increasing frequencies, a spectral sweep, as an excitatory signal. A Goertzel technique may also be applied. For example, the Goertzel technique, which may evaluate the individual terms of a discrete Fourier transform (DFT), may be used at each frequency of a measured frequency response. In other words, this sequence of terms may make up the DFT.

The Goertzel technique may be based on digital signal processing (DSP) and may provide a way for efficient evaluation of individual terms, in this case, for discrete Fourier transform (DFT). DFT may allow conversion of a finite sequence of equally-spaced samples of a function into a same-length sequence of equally-spaced samples of the discrete-time Fourier transform (DTFT), which may be complex-valued function of frequency. The DFT may therefore be understood as a frequency domain representation of an original input sequence. In other words, if the original sequence spans all non-zero values of a function, its DTFT may be continuous (and periodic), and the DFT may provide discrete samples of one cycle. If the original sequence is one cycle of a periodic function, the DFT may provide all non-zero values of on DTFT cycle.

By analyzing a selectable frequency component from a discrete signal, the Goertzel technique may apply a single real-valued coefficient at each iteration, using real-valued arithmetic for real-valued input sequences. For covering a full spectrum, the Goertzel technique may have a higher order of complexity than fast Fourier transform (FFT). The relatively simple structure of Goertzel technique may make it well-suited for small processors and embedded applications. It should be appreciated that the Goertzel technique may also be used in "reverse" as sinusoid synthesis function, which may employ a multiplication and a subtraction per generated sample. Other variations may also be provided. It should be appreciated that the Goertzel technique may be based on an algorithm that has the form of a digital filter, which may be apparent to one of ordinary skill in the art. Measuring load coils by generating tones and performing calculations for terms of the DFT at each frequency individually may be achieved, but may not necessarily be the most inefficient. Using a PRBS-based technique, however, may help increase the speed of calculation of the DFT terms because calculations may be performed in a single operation.

There may be commonalities or similarities with a frequency response (e.g., impedance as a function of frequency) and a PRBS technique. For both the frequency response and PRBS, Prony's technique, which may be similar to Fourier transform, may be used to analyze the frequency response. In an example, Prony's technique may extract valuable information from a uniformly sampled signal and may build a series of damped complex exponentials or sinusoids. This may allow estimation of frequency, amplitude, phase, damping components, and other characteristics of a signal.

The output of Prony's analysis may be two polynomials—one for zeros and one for poles. Specifically, in the context of network testing and measuring load coils, the analysis of these poles and zeros may be used to estimate the number of load coils on a circuit.

Generation of the PRBS signal may occur in multiple stages. In an example, the first stage may include generation of a pseudorandom binary sequence (PRBS). The PRBS may be a sequence of zeros and ones. The second stage may include this bit sequence being stretched, centered about zero (zero mean), and then transformed to the frequency domain using, for example, a discrete Fourier transform (DFT). The third stage may involve a normalized Sinc Function that may be then applied. The Sinc Function may effectively act as a low-pass filter to limit high-frequency noise. Other details of a Sinc Function may be understood by one of ordinary skill in the art.

At the fourth stage, a Gaussian Window function may be applied as a way of smoothing a waveform. Finally, at a fifth state, the resulting signal may be transformed back to the time domain using an inverse Fourier transform. This may generate a signal with desired properties for load coil detection and measurement.

The length of the PRBS may be determined by the number of bits used. For example, all possible bit combinations may be generated, except zero. Therefore, the bit sequence length may be $2^n-1$, where n represents a number of bits. Thus, a sequence using 6 bits may be $2^6-1=63$ in length. A generating polynomial may be used to generate the bit sequence and may be a function of the number of bits used. In the testing of this technique, a number of sequences were tried and a 7-bit sequence was finally used, for a sequence length of $2^7-1=127$.

In actual implementation, generation of the PRBS signal may be achieved by a variety of ways. For example, a PRBS signal may be generated using a Python script or other similar technique. This may allow for adjustment of the parameters used in the signal generation as a part of the necessary experimentation to optimize the method.

A pre-generated PRBS signal may loaded into an arbitrary wave table of a narrow-band digital-to-analog converter (NBDAC). This signal may then be repeatedly transmitted and the response read/interpreted. A DFT may be applied to the measured signal to generate all the terms of the discrete Fourier transform simultaneously.

Once the terms of the DFT are calculated, the new method may be the same as the old method. The DFT terms, for example, may be converted into impedances, which gives the impedance as a function of frequency. This is then converted to polynomials using Prony's method and the resultant poles and zeros analyzed.

Figure 3:
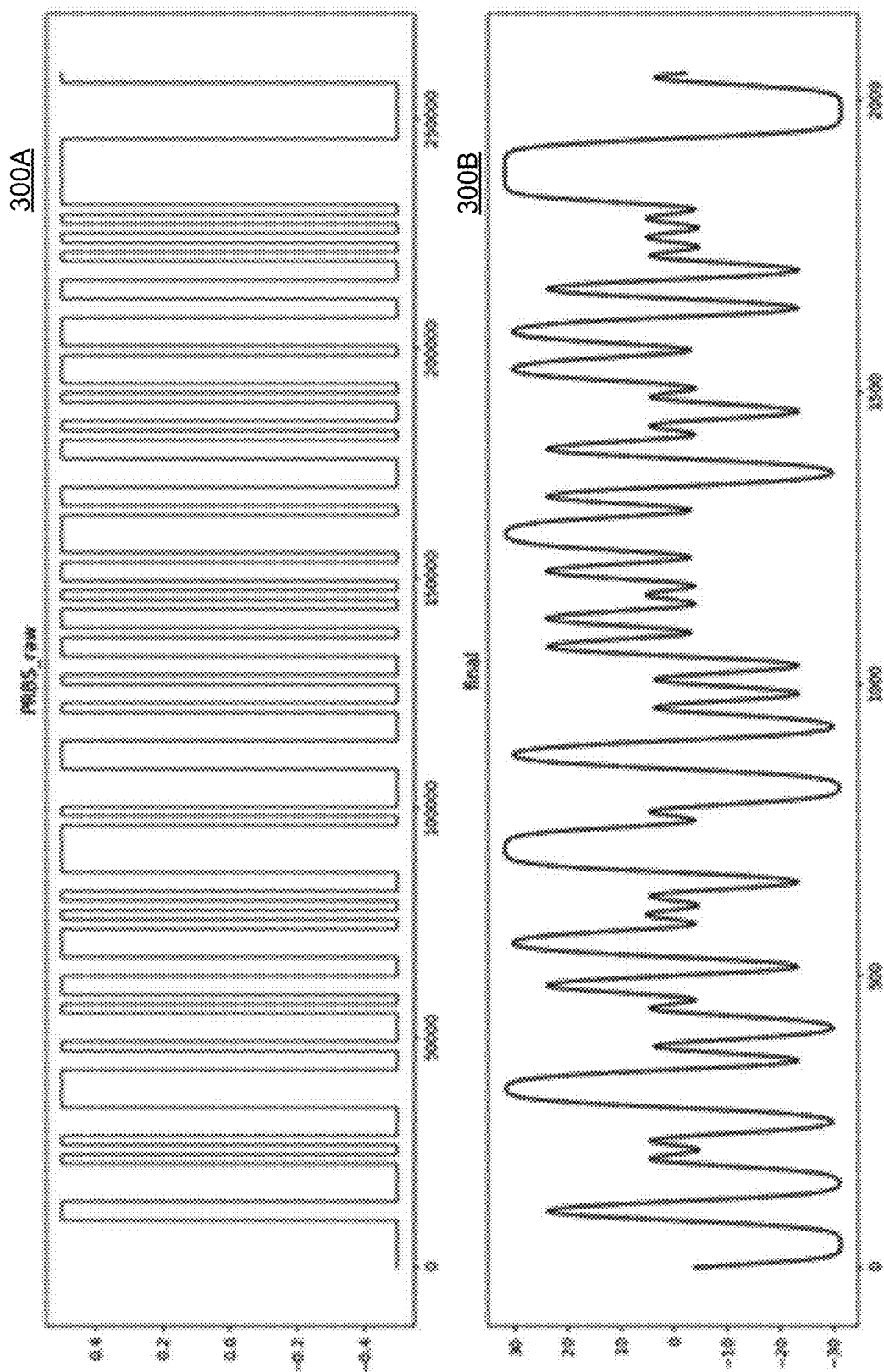
FIG. 3 illustrates an initial PRBS plot 400A and a final PRBS plot 400B in load coil measurements in a network, according to an example.

FIG. 3 illustrates an initial PRBS plot 300A and a final PRBS plot 300B in load coil measurements in a network, according to an example. As shown, two plots may be depicted. Plot 300A may represent an initial PRBS signal, and the plot 300B may represent a final PRBS signal. In the first plot 300A, raw PRBS signal may be been stretched and centered about zero. It should be appreciated that the signal may extend from −0.5 to +0.5. This raw PRBS signal may then be transformed to the frequency domain using a DFT, filtered, and then transformed back to the time domain using an inverse DFT, giving the final PRBS plot 300B. The final plot 300B may be of length 2048, which corresponds to a size of the arbitrary waveform buffer in NBDAC.

As described herein, the primary advantage of the PRBS method is the speed of calculation of the DFT terms. Measuring load coils by generating tones and performing calculations for terms of the DFT at each frequency individually may be time-consuming and inefficient. The PRBS technique, as described herein, may perform calculations in a single operation. By doing so, load coil measurements using a PRBS-based technique may be significantly faster. For example, systems using the PRBS-based technique may be four times faster than conventional systems and techniques.

Figure 4:
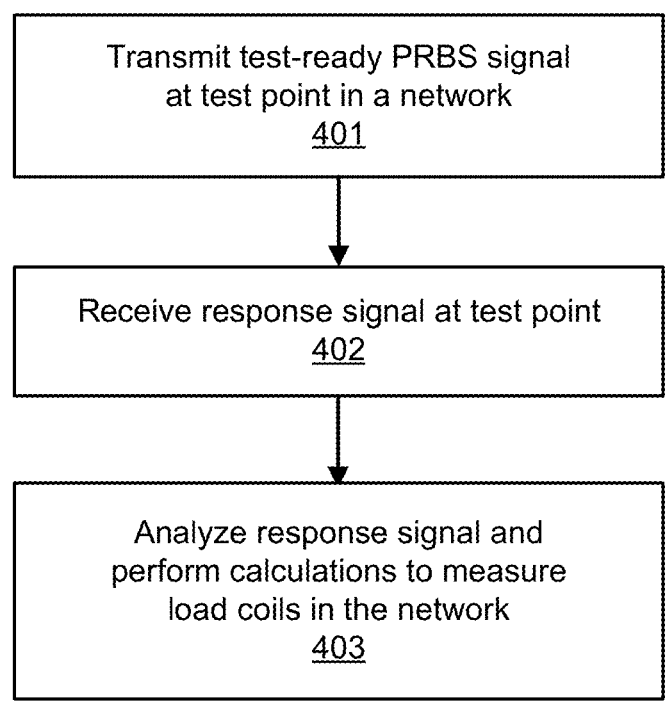
FIG. 4 illustrates a flow chart of a method for measuring load coils in a network using a PRBS-based technique, according to an example.

FIG. 4 illustrates a flow chart of a method 400 for measuring load coils in a network using a PRBS-based technique, according to an example. The method 400 is provided by way of example, as there may be a variety of ways to carry out the method described herein. Although the method 400 is primarily described as being performed by test instrument 200 in at least scenarios depicted in FIGS. 1 and 3, the method 400 may be executed or otherwise performed by one or more processing components of the test instrument 200, or by another system or a combination of systems. Each block shown in FIG. 4 may further represent one or more processes, methods, or subroutines, and one or more of the blocks may include machine readable instructions stored on a non-transitory computer readable medium and executed by a processor or other type of processing circuit to perform one or more operations described herein.

At block 401, the test instrument 200 may transmit, at the port 203, transmission circuit 241, and/or processing circuit 250, a plurality of test signals at a test point in a network. In some examples, the network may be a DSL network or other cable or optical network. In an example, the test signal may be a test-ready pseudorandom binary sequence (PRBS) signal.

For example, the test-ready pseudorandom binary sequence (PRBS) signal may be created by generating a pseudorandom binary sequence (PRBS). Here, the PRBS may be a bit sequence represented by a series of zeros and ones, and length of the PRBS may be determined by number of bits used. In particular, the PRBS may be converted to a test-ready PRBS signal by: transforming the PRBS to a frequency domain by stretching the bit sequence of the PRBS, centering the PRBS about zero, and converting the PRBS to a frequency domain using a discrete Fourier Transform (DFT). A normalizing function (e.g., Sinc Function) may be applied to the frequency domain. In an example, the Sinc Function may serve as a low-pass filter to limit high-frequency noise. A smoothing function (e.g., Gaussian Window function) may also be applied to the normalized frequency domain. The smoothed and normalized frequency domain may be transformed into a time domain using, for example, an inverse Fourier transform to create the test-ready PRBS signal.

It should be appreciated that the PRBS may be generated using a Python script or other method. Also, in another example, the PRBS may be loaded into a wave table of a narrow-band digital-to-analog converter (NBDAC) before being transmitted.

At block 402, the test instrument 200 may receive, at the port 203, receiver circuit 242, and/or processing circuit 250, a plurality of response signals at the test point.

At block 403, the test instrument 200 may analyze, at the processing circuit 250, the plurality of response signals. The processing circuit 250 may perform at least one load coil measurement. This may be achieved by applying a transformation calculation to generate a plurality of terms of the transformation calculation simultaneously. In one example, the transformation calculation may be a discrete Fourier transform (DFT). The processing circuit 250 may convert the plurality of terms of the transformation calculation into a plurality of impedances. Here, the plurality of impedances may be represented as a function of frequency. The processing circuit 250 may then convert the impedances into polynomials using a conversion technique (e.g., Prony's method or technique). The processing circuit 250 may then analyze the polynomials for poles and zeros, which may be used to estimate load coils in the network.

It should also be appreciated that the test instrument 200 may also provide other components not shown. For example, middleware (not shown) may be included as well. The middleware may include software hosted by one or more servers or devices. Furthermore, it should be appreciated that some of the middleware or servers may or may not be needed to achieve functionality. Other types of servers, middleware, systems, platforms, and applications not shown may also be provided at the back-end to facilitate the features and functionalities of the testing and measurement system.

Moreover, single components may be provided as multiple components, and vice versa, to perform the functions and features described herein. It should be appreciated that the components of the system described herein may operate in partial or full capacity, or it may be removed entirely. It should also be appreciated that analytics and processing techniques described herein with respect to the test instrument 200, for example, may also be performed partially or in full by other various components of the overall system.

It should be appreciated that the data stores described herein may include volatile and/or nonvolatile data storage that may store data and software or firmware including machine-readable instructions. The software or firmware may include subroutines or applications that perform the functions of the test instrument 200 and/or run one or more application that utilize data from the test instrument 200 or other communicatively coupled system.

The various components, circuits, elements, and interfaces, may be any number of hardware, network, or software components, circuits, elements, and interfaces that serves to facilitate communication, exchange, and analysis data between any number of or combination of equipment, protocol layers, or applications. For example, the interfaces described herein may each include a network interface to communicate with other servers, devices, components or network elements via a network.

Although examples described herein are directed to measuring load coils in a DSL network, it should be appreciated that that the test instrument 200 may also use these and other various techniques in to provide a host of other measurements and determinations in a variety of different types of networks, such as interference analysis, signal analysis, and/or other related measurements. Other types of networks may include optical networks, cable networks, or other networks. Ultimately, the systems and methods described herein may minimize time for calculations and maximize measurement efficiencies.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

The invention claimed is:

1. A test device comprising:
    a transmitter to transmit a plurality of test signals at a test point in a network, wherein the test signal is a test-ready pseudorandom binary sequence (PRBS) signal converted from a PRBS signal based on a frequency domain;
    a receiver to receive a plurality of response signals at the test point; and
    a processor to analyze the plurality of response signals and perform at least one load coil measurement by:
        applying a transformation calculation to generate a plurality of terms of the transformation calculation simultaneously;
        converting the plurality of terms of the transformation calculation into a plurality of impedances, wherein the plurality of impedances is represented as a function of frequency;
        converting the plurality of impedances into polynomials using a conversion technique;
        analyzing the polynomials for poles and zeros; and
        estimating at least one load coil measurement based on the poles and zeros of the polynomials.

2. The test device of claim 1, wherein the test-ready PRBS signal is created by:
    generating a pseudorandom binary sequence (PRBS), wherein the PRBS is a bit sequence represented by a series of zeros and ones, and wherein length of the PRBS is determined by number of bits used; and
    wherein converting the PRBS to a test-ready PRBS signal comprises:
        transforming the PRBS to a frequency domain by:
            stretching the bit sequence of the PRBS;
            centering the PRBS about zero; and
            converting the PRBS to a frequency domain using a discrete Fourier Transform (DFT);
        applying a normalizing function to the frequency domain;
        applying a smoothing function to the normalized frequency domain; and
        transforming the smoothed and normalized frequency domain to a time domain using an inverse Fourier transform to create the test-ready PRBS signal.

3. The test device of claim 2, wherein the PRBS is generated using a Python script.

4. The test device of claim 2, wherein the PRBS is loaded into a wave table of a narrow-band digital-to-analog converter (NBDAC).

5. The test device of claim 2, wherein the normalizing function is a Sinc Function that serves as a low-pass filter to limit high-frequency noise.

6. The test device of claim 2, wherein the smoothing function is a Gaussian Window function.

7. The test device of claim 1, wherein the transformation calculation is a discrete Fourier transform (DFT).

8. The test device of claim 1, wherein the conversion technique is Prony's technique.

9. A method for measuring load coils, comprising:
    transmitting, via a transmitter, a plurality of test signals at a test point in a network, wherein the test signal is a test-ready pseudorandom binary sequence (PRBS) signal converted from a PRBS signal based on a frequency domain;
    receiving, via a receiver, a plurality of response signals at the test point; and
    analyzing, at a processor, the plurality of response signals and performing at least one load coil measurement by:
        applying a transformation calculation to generate a plurality of terms of the transformation calculation simultaneously;
        converting the plurality of terms of the transformation calculation into a plurality of impedances, wherein the plurality of impedances is represented as a function of frequency;
        converting the plurality of impedances into polynomials using a conversion technique;
        analyzing the polynomials for poles and zeros; and
        estimating at least one load coil measurement based on the poles and zeros of the polynomials.

10. The method of claim 9, wherein the test-ready PRBS signal is created by:
    generating a pseudorandom binary sequence (PRBS), wherein the PRBS is a bit sequence represented by a series of zeros and ones, and wherein length of the PRBS is determined by number of bits used; and
    wherein converting the PRBS to a test-ready PRBS signal comprising:
        transforming the PRBS to a frequency domain by:
            stretching the bit sequence of the PRBS;
            centering the PRBS about zero; and
            converting the PRBS to a frequency domain using a discrete Fourier Transform (DFT);
        applying a normalizing function to the frequency domain;
        applying a smoothing function to the normalized frequency domain; and
        transforming the smoothed and normalized frequency domain to a time domain using an inverse Fourier transform to create the test-ready PRBS signal.

11. The method of claim 10, wherein the PRBS is generated using a Python script.

12. The method of claim 10, wherein the PRBS is loaded into a wave table of a narrow-band digital-to-analog converter (NBDAC).

13. The method of claim 10, wherein the normalizing function is a Sinc Function that serves as a low-pass filter to limit high-frequency noise.

14. The method of claim 10, wherein the smoothing function is a Gaussian Window function.

15. The method of claim 9, wherein the transformation calculation is a discrete Fourier transform (DFT).

16. The method of claim 9, wherein the conversion technique is Prony's technique.

17. A non-transitory computer-readable storage medium having an executable stored thereon, which when executed instructs a processor to perform the method of claim 9.

18. A method of creating a test-ready pseudorandom binary sequence (PRBS) signal for measuring load coils, comprising:
  generating a pseudorandom binary sequence (PRBS), wherein the PRBS is a bit sequence represented by a series of zeros and ones, and wherein length of the PRBS is determined by number of bits used; and
  converting the PRBS to a test-ready PRBS signal by:
    transforming the PRBS to a frequency domain by:
      stretching the bit sequence of the PRBS;
      centering the PRBS about zero; and
      converting the PRBS to a frequency domain using a discrete Fourier Transform (DFT);
    applying a normalizing function to the frequency domain, wherein the normalizing function is a Sinc Function that serves as a low-pass filter to limit high-frequency noise;
    applying a smoothing function to the normalized frequency domain, wherein the smoothing function is a Gaussian Window function; and
    transforming the smoothed and normalized frequency domain to a time domain using an inverse Fourier transform to create the test-ready PRBS signal.

* * * * *